United States Patent
Liu et al.

(10) Patent No.: US 9,952,365 B2
(45) Date of Patent: *Apr. 24, 2018

(54) CONVERSION FILM, ELECTRONIC DEVICE AND FABRICATION METHODS THEREOF

(71) Applicants: Xiamen Tianma Micro-electronics Co., Ltd., Xiamen (CN); Tianma Micro-electronics Co., Ltd., Shenzhen (CN)

(72) Inventors: Xiaomin Liu, Xiamen (CN); Ting Zhou, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 15 days.

This patent is subject to a terminal disclaimer.

(21) Appl. No.: 14/997,202

(22) Filed: Jan. 15, 2016

(65) Prior Publication Data
US 2016/0238764 A1 Aug. 18, 2016

(30) Foreign Application Priority Data
Feb. 13, 2015 (CN) .......................... 2015 1 0078534

(51) Int. Cl.
*G02B 5/30* (2006.01)

(52) U.S. Cl.
CPC ................... *G02B 5/305* (2013.01)

(58) Field of Classification Search
CPC ...... G02B 5/30; G02B 5/3025; G02B 5/3033; G02B 5/3041; G02B 5/305; G02B 27/28;
(Continued)

(56) References Cited

U.S. PATENT DOCUMENTS 3,313,052 A * 4/1967 Malster .................. B32B 27/00
  235/488
4,286,843 A * 9/1981 Reytblatt ............. G02B 5/3025
  356/33
(Continued)

FOREIGN PATENT DOCUMENTS

CN    102822704 A    12/2012
CN    102903735 A    1/2013
(Continued)

OTHER PUBLICATIONS

Wang, CN 103852896, English language machine translation of description.*
(Continued)

*Primary Examiner* — Stephone B Allen
*Assistant Examiner* — Adam W Booher
(74) *Attorney, Agent, or Firm* — Anova Law Group, PLLC

(57) ABSTRACT

The present disclosure provides a conversion film configured on the electronic device. The conversion film includes a first regionalized polarizing film having at least two different polarization directions, a second regionalized polarizing film configured on the first regionalized polarizing film having at least one polarization direction, and an adhesive layer configured between the first regionalized polarizing film and the second regionalized polarizing film to bond the first regionalized polarizing film and the second regionalized polarizing film together. One of the polarization directions of the second regionalized polarizing film is same as one of the polarization directions of the first regionalized polarizing film.

7 Claims, 11 Drawing Sheets

(58) Field of Classification Search
CPC .. G02B 27/281; G02B 27/288; G02B 5/1809; G02B 5/20; G02B 5/223; G02B 5/3083; G02B 27/286; B42D 15/00; B42D 2035/20; B42D 2033/00; B42D 2033/04; G09F 3/00; G09F 3/0288; G09F 3/0291; G09F 3/0292; G09F 2003/0213; G09F 2003/0257; G09F 2003/0277; B41M 3/003; B41M 3/14; B41M 3/148; G03G 21/04; G03G 21/043; G03G 21/046; G03C 9/00–9/06
USPC ............. 283/17, 57–59, 70, 72, 90, 98–101; 380/283; 359/486.03, 890
See application file for complete search history.

(56) References Cited

U.S. PATENT DOCUMENTS

| | | | | |
|---|---|---|---|---|
| 6,049,428 | A * | 4/2000 | Khan | C07C 309/44 359/487.02 |
| 6,337,111 | B1 * | 1/2002 | Ichihashi | C09K 19/601 252/299.1 |
| 2003/0227669 | A1 * | 12/2003 | Volke | G02B 5/3033 359/352 |
| 2011/0141409 | A1 * | 6/2011 | Ashida | G02B 5/3033 349/96 |

FOREIGN PATENT DOCUMENTS

| | | |
|---|---|---|
| CN | 203254709 U | 10/2013 |
| CN | 103852896 A | 6/2014 |
| CN | 103969840 A | 8/2014 |
| CN | 203854278 U | 10/2014 |

OTHER PUBLICATIONS

Lei Zhangyuan et al., Fabrication of Axially-Symmetric Phase Retardation Plate by Use of Azobenzene-Containing Copolymer, Acta Optica Sinica, vol. 30, No. 8, Aug. 31, 2010, pp. 2463-2466.

* cited by examiner

CONVERSION FILM, ELECTRONIC DEVICE AND FABRICATION METHODS THEREOF

CROSS-REFERENCES TO RELATED APPLICATIONS

This application claims the priority of Chinese Patent Application No. CN201510078534.0, filed on Feb. 13, 2015, the entire contents of which are incorporated herein by reference.

FIELD OF THE DISCLOSURE

The present disclosure generally relates to the field of optical film technologies and, more particularly, relates to a conversion film, an electronic device, and fabrication methods thereof.

BACKGROUND

With the diversification of the market, electronic device protective films attached on the cell phones, MP3 players, notebook computers, and other digital devices are no longer used only for protecting device screens and bodies from the wear and tear. The protective films also provide cosmetic and decorative functions by printing various patterns and colors on the protective films. Further, in order to meet the public demand, protective cases provide even more varieties, better workmanship, and more attractive patterns and colors.

The protective cases are made of various types of materials, including leather, silicon, cloth, hard plastic, soft plastic, velvet, and silk, etc. Personalized paintings on the protective cases may also serve the decoration purpose. However, the protective films and protective cases usually have a single static color pattern. A special film may be attached onto the protective films and protective cases to change the original color pattern. But replacing the protective cases for different color patterns is often costly, lack of a sense of interacting, and less attractive.

The disclosed conversion film, electronic device and fabrication method are directed to solve one or more problems in the art.

BRIEF SUMMARY OF THE DISCLOSURE

Directed to solve one or more problems set forth above and other problems in the art, the present disclosure provides a conversion film, an electronic device and a fabrication method to user experience.

One aspect of the present disclosure includes a conversion film. The conversion film includes a first regionalized polarizing film having at least two different polarization directions, a second regionalized polarizing film configured on the first regionalized polarizing film, having at least one polarization direction, and an adhesive layer configured between the first regionalized polarizing film and the second regionalized polarizing film to bond the first regionalized polarizing film and the second regionalized polarizing film together, wherein one of the polarization directions of the second regionalized polarizing film is same as one of the polarization directions of the first regionalized polarizing film.

Another aspect of the present disclosure provides an electronic device. The electronic device includes a main body, an image layer printed on the main body, a first regionalized polarizing film configured on the image layer, having at least two different polarization directions, a second regionalized polarizing film configured on the first regionalized polarizing film, having at least one polarization direction, a second adhesive layer configured between the conversion film and the image layer to bond the conversion film and the image layer together, and a first adhesive layer configured between the first regionalized polarizing film and the second regionalized polarizing film to bond the first regionalized polarizing film and the second regionalized polarizing film together, wherein one of the polarization directions of the second regionalized polarizing film is same as one of the polarization directions of the first regionalized polarizing film.

Another aspect of the present disclosure provides a method for fabricating the electronic device. A main body is provided. An image layer is printed on the main body. A second adhesive layer is formed on the image layer. A first regionalized polarizing film is formed and bonded onto the second adhesive layer. A first adhesive layer is formed on the first regionalized polarizing film. A second regionalized polarizing film is formed and bonded onto the first adhesive layer. The first regionalized polarizing film has at least two different polarization directions. The second regionalized polarizing film has at least one polarization direction. One of the polarization directions of the second regionalized polarizing film is same as one of the polarization directions of the first regionalized polarizing film.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
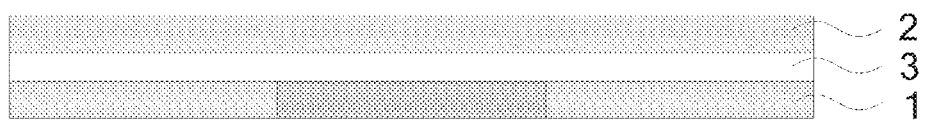
FIG. 1 illustrates a cross-sectional view of an exemplary conversion film according to the disclosed embodiments.

FIG. 1 illustrates a cross-sectional view of an exemplary conversion film according to the present disclosure. Referring to FIG. 1, the conversion film may include a first regionalized polarizing film 1, a second regionalized polarizing film 2 configured on the first regionalized polarizing film 1, and a first adhesive layer 3 configured between the first regionalized polarizing film 1 and the second regionalized polarizing film 2 to bond the first regionalized polarizing film 1 and the second regionalized polarizing film 2 together. The first adhesive layer 3 may be made of one or more of urea-formaldehyde glue, epoxy glue, polyacrylate glue, and polyvinyl acetate emulsion.

Figure 2:
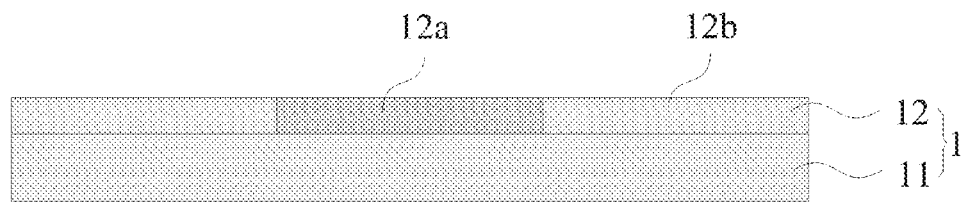
FIG. 2 illustrates a cross-sectional view of an exemplary first regionalized polarizing film according to the disclosed embodiments.

FIG. 2 illustrates a cross-sectional view of an exemplary first regionalized polarizing film according to the present disclosure. Referring to FIG. 2, the first regionalized polarizing film 1 may include a flexible substrate 11 and a regionalized polarizing layer 12 configured on the flexible substrate 11. The regionalized polarizing layer 12 may have at least two different polarization directions. In one embodiment, the regionalized polarizing layer 12 may have two different polarization directions 12a and 12b, corresponding to a plurality of first regions and a plurality of second regions. The flexible substrate 11 may be made of polyimide or polydimethylsiloxane, providing sufficient flexibility for the first regionalized polarizing film 1. The regionalized polarizing layer 12 may be made of polymer doped with a dichroic organic dye.

The dichroic organic dye may be an organic dye displaying different colors due to different light absorption levels along the long axis and the short axis of organic dye molecules. The dichroic organic dye may have a dichroic ratio greater than 7. The dichroic organic dye may include azo dye, anthraquinone dye, biphenyl dye, triphenylmethane diazinon and derivative dye, single methine or multi-methine dye, or polycyclic dye. The dichroic organic dye may be mixed with a polymer, such as a heat resistant polyimide.

When being irradiated by a polarized ultra violet light, the imide groups of the polymer molecules may be excited to produce free radicals, causing the polymer to degrade. In the polarization direction of the polarized ultra violet light, the imide groups of polymer molecules may be broken down. In the direction perpendicular to the polarization direction of the polarized ultra violet light, the polymer molecules may still have a large number of unbroken imide groups. Driven by the Van der Waals forces, the polymer molecules may obtain an alignment direction perpendicular to the polarization direction of the polarized ultra violet light. The alignment of the polyimide polymer molecules may further cause the orderly alignment of the dichroic dye molecules mixed into the polyimide polymer. Because the dichroic organic dye molecules have different light permeability levels in the long axis and short axis, the polarization direction of the regionalized polarizing layer 12 may be obtained.

Figure 3:
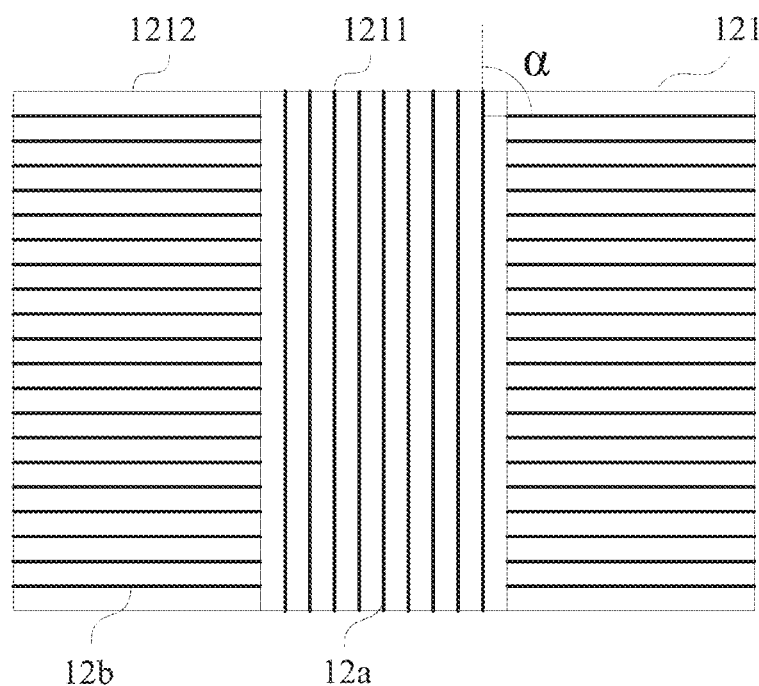
FIG. 3 illustrates a top view of an exemplary first regionalized polarizing film according to the disclosed embodiments.

FIG. 3 illustrates a top view of an exemplary first regionalized polarizing film according to the present disclosure. Referring to FIG. 3, the regionalized polarizing layer 12 of the first regionalized polarizing film 1 may include two different polarization directions, a first polarization direction 12a and a second polarization direction 12b. That is, the first regionalized polarizing film 1 may include a plurality of first regions 1211 and second regions 1212 that are arranged alternately and repeatedly. The polarization direction of the first regions 1211 may be the first polarization direction 12a. The polarization direction of the second regions 1212 may be the second polarization direction 12b.

In one embodiment, the first polarization direction 12a may be approximately perpendicular to the second polarization direction 12b. That is, the polarization directions 12a and 12b in adjacent regions of the first regionalized polarizing film 1 may have an angle α at about 90°.

Figure 4:
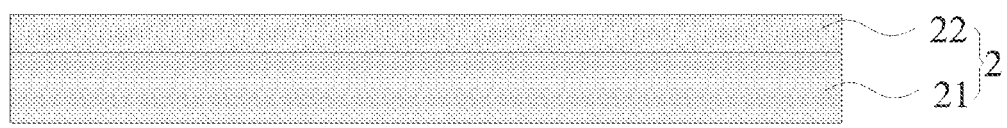
FIG. 4 illustrates a cross-sectional view of an exemplary second regionalized polarizing film according to the disclosed embodiments.

FIG. 4 illustrates a cross-sectional view of an exemplary second regionalized polarizing film according to the present disclosure. Referring to FIG. 4, the second regionalized polarizing film 2 may include a flexible substrate 21 and a regionalized polarizing layer 22 configured on the flexible substrate 21. The regionalized polarizing layer 22 may have at least one polarization direction. In one embodiment, the regionalized polarizing layer 22 has one polarization direction.

Figure 5:
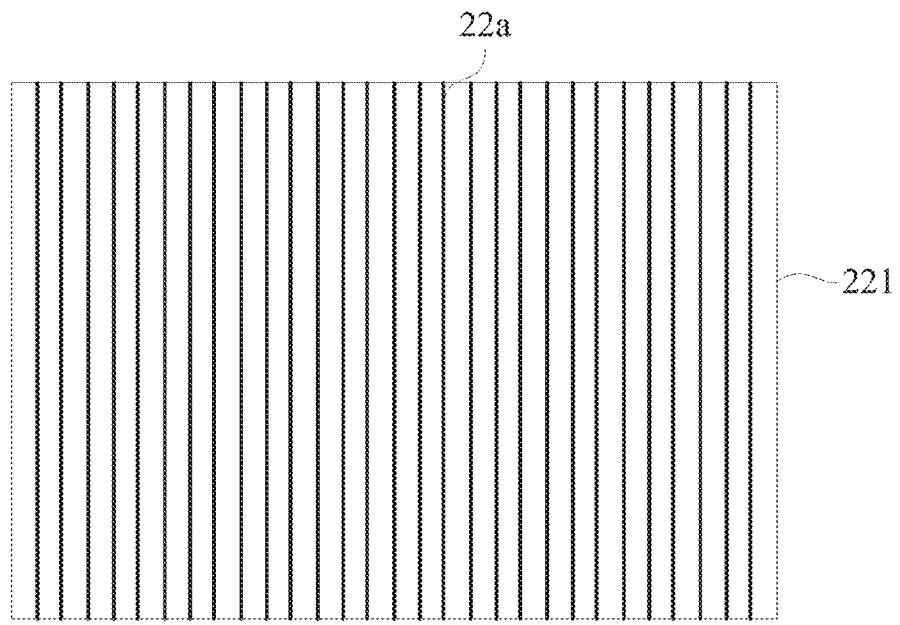
FIG. 5 illustrates a top view of an exemplary second regionalized polarizing film according to the disclosed embodiments.

FIG. 5 illustrates a top view of an exemplary second regionalized polarizing film according to the present disclosure. Referring to FIG. 5, the regionalized polarizing layer 221 of the second regionalized polarizing film 2 may have a sixth polarization direction 22a same as the first polarization direction 12a of the first regionalized polarizing film 1.

In one embodiment, when the second regionalized polarizing film 2 and the first regionalized polarizing film 1 are bonded and used together, the second regionalized polarizing film 2 and the first regionalized polarizing film 1 may have coordinated polarization directions. The sixth polarization direction 22a of the second regionalized polarizing film 2 may be parallel with the first polarization direction 12a of the first regionalized polarizing film 1. Because the sixth polarization direction 22a is same as the first polarization direction 12a of the first regionalized polarizing film 1, a light passing through the first regionalized polarizing film 1 with a polarization direction parallel with the first polarization direction 12a of the first regionalized polarizing film 1 may pass through the second regionalized polarizing film 2 to illuminate and display an image corresponding to the first regions 1211 of the first regionalized polarizing film 1.

In the meantime, the sixth polarization direction 22a of the second regionalized polarizing film 2 may be orthogonal to the second polarization direction 12b of the first regionalized polarizing film 1. Thus, a light passing through the first regionalized polarizing film 1 with a polarization direction orthogonal to the second polarization direction 12b of the first regionalized polarizing film 1 may be blocked by the second regions 1212 of the first regionalized polarizing film 1. Thus, an image corresponding to the second regions 1212 of the first regionalized polarizing film 1 may not be illuminated or displayed.

Figure 6:
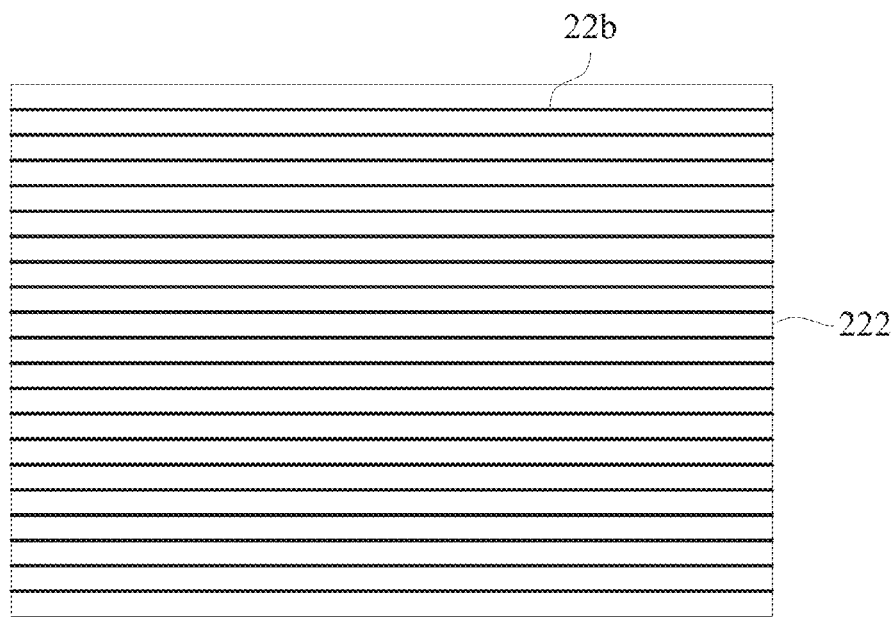
FIG. 6 illustrates a top view of another exemplary second regionalized polarizing film according to the disclosed embodiments.

FIG. 6 illustrates a top view of another exemplary second regionalized polarizing film according to the present disclosure. Referring to FIG. 6, the regionalized polarizing layer 222 of the second regionalized polarizing film 2 may have a seventh polarization direction 22b same as the second polarization direction 12b of the first regionalized polarizing film 1.

In one embodiment, when the second regionalized polarizing film 2 and the first regionalized polarizing film 1 are bonded and used together, the second regionalized polarizing film 2 and the first regionalized polarizing film 1 may have coordinated polarization directions. The seventh polarization direction 22b of the second regionalized polarizing film 2 may be parallel with the second polarization direction 12b of the first regionalized polarizing film 1. Because the seventh polarization direction 22b is same as the second polarization direction 12b of the first regionalized polarizing film 1, a light passing through the second regionalized polarizing film 2 with a polarization direction parallel with the second polarization direction 12b of the first regionalized polarizing film 1 may pass through the second regions 1212 of the first regionalized polarizing film 1 to illuminate and display an image corresponding to the second regions 1212 of the first regionalized polarizing film 1.

In the meantime, the seventh polarization direction 22b of the second regionalized polarizing film 2 may be orthogonal to the first polarization direction 12a of the first regionalized polarizing film 1. Thus, a light passing through the first regionalized polarizing film 1 with a polarization direction orthogonal to the first polarization direction 12a of the first regionalized polarizing film 1 may be blocked by the first regions 1211 of the first regionalized polarizing film 1. Thus, an image corresponding to the first regions 1211 of the first regionalized polarizing film 1 may not be illuminated or displayed.

When the second regionalized polarizing film 2 has a polarization direction parallel with at least one of the polarization directions of the first regionalized polarizing film 1, the image may be illuminated and displayed in the regions of the first regionalized polarizing film 1 that have the same polarization direction with the polarization direction of the second regionalized polarizing film 2. Further, the adjacent polarization directions of the first regionalized polarizing film 1 may be separated evenly by an angle α=180°/n, wherein n is the total number of polarization directions of the first regionalized polarizing film 1. That is, the adjacent polarization directions of the first regionalized polarizing film 1 are evenly separated by an angle as large as possible. When the first regionalized polarizing film 1 and the second regionalized polarizing film 2 are bonded and used together, each polarization direction of the first regionalized polarizing film 1 may properly coordinate with the polarization direction of the second regionalized polarizing film 2. Within the tolerance of the bonding precision, only the image in the target regions may be illuminated and displayed.

In one embodiment, the flexible substrate 21 of the second regionalized polarizing film 2 may be made of polyimide or polyimethylsiloxane, providing sufficient flexibility for the second regionalized polarizing film 2. The regionalized polarizing layer 22 of the second regionalized polarizing film 2 may be made of polymer doped with a dichroic organic dye.

The dichroic organic dye may be an organic dye displaying different colors due to different light absorption levels along the long axis and the short axis of organic dye molecules. The dichroic organic dye may have a dichroic ratio greater than 7. The dichroic organic dye may be an azo dye, an anthraquinone dye, a biphenyl dye, a triphenylmethane diazinon and derivative dye, a single methine or multi-methine dye, or a polycyclic dye. The dichroic organic dye may be mixed with a polymer, such as a heat resistant polyimide.

When being irradiated by a polarized ultra violet light, the imide groups of the polymer molecules may be excited to produce free radicals, causing the polymer to degrade. In the polarization direction of the polarized ultra violet light, the imide groups of polymer molecules may be broken down. In the direction perpendicular to the polarization direction of the polarized ultra violet light, the polymer molecules may still have a large number of unbroken imide groups. Driven by the Van der Waals forces, the polymer molecules may obtain an alignment direction perpendicular to the polarization direction of the polarized ultra violet light. The alignment of the polyimide polymer molecules may further cause the orderly alignment of the dichroic dye molecules mixed into the polyimide polymer. Because the dichroic organic dye molecules have different light permeability levels in the long axis and short axis, the polarization direction of the regionalized polarizing layer 22 may be obtained.

In another embodiment, the first regionalized polarizing film 1 may have at least two different polarization directions. When the first regionalized polarizing film 1 is coordinated with the second regionalized polarizing films 2 with pre-configured polarization directions, different images may be illuminated and displayed. That is, the angles α between any two adjacent polarization directions of the first regionalized polarizing film 1 must be greater than 1°. The first polarization direction 12a and the second polarization direction 12b may form any angle α as long as α>1°.

Unlike the polarizing films formed by stretching, the first regionalized polarizing film 1 and the second regionalized polarizing film 2 may be formed by irradiating polarized ultra violet light onto a polymer film coated over the flexible substrate to form different polarization directions in different regions. No additional protective film or adhesive layer may be needed. Thus, the reliability of the regionalized polarizing layer may be improved, and overall thickness of the regionalized polarizing layer may be reduced. At the same time, by coordinating the polarization directions of the first regionalized polarizing film 1 and the second regionalized polarizing film 2, the conversion film may provide desired image on the electronic device according to user preference. The easy change of the images makes the conversion film interesting and affordable.

Figure 7:
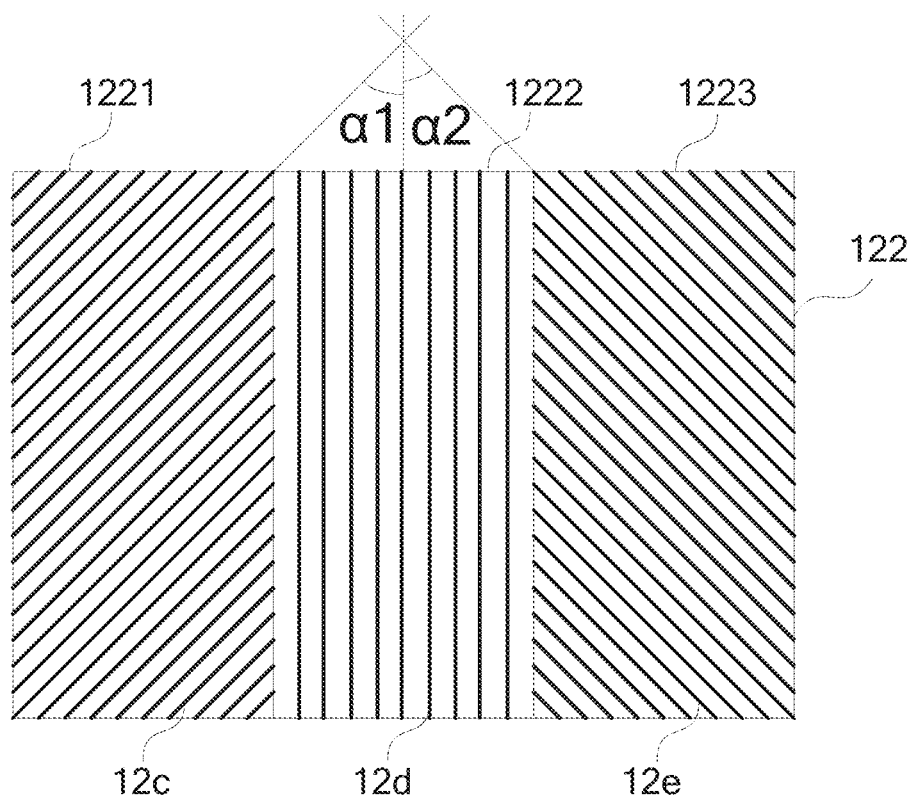
FIG. 7 illustrates a top view of another exemplary first regionalized polarizing film according to the disclosed embodiments.

FIG. 7 illustrates a top view of another exemplary first regionalized polarizing film according to the present disclosure. Referring to FIG. 7, the regionalized polarizing layer 122 of the first regionalized polarizing film 1 may have three different polarization directions, a third polarization direction 12c, a fourth polarization direction 12d, and a fifth polarization direction 12e. That is, the first regionalized polarizing film 1 may include a third region 1221 having the third polarization direction 12c, a fourth region 1222 having the fourth polarization direction 12d, and a fifth region 1223 having the fifth polarization direction 12e.

In one embodiment, the third polarization direction 12c, the fourth polarization direction 12d, and the fifth polarization direction 12e may be evenly separated by an angle at approximately 60°. That is, the angle α1 between the third polarization direction 12c and the fourth polarization direction 12d may be at approximately 60°, and the angle α2 between the fourth polarization direction 12d and the fifth polarization direction 12e may be at approximately 60°.

Figure 8:
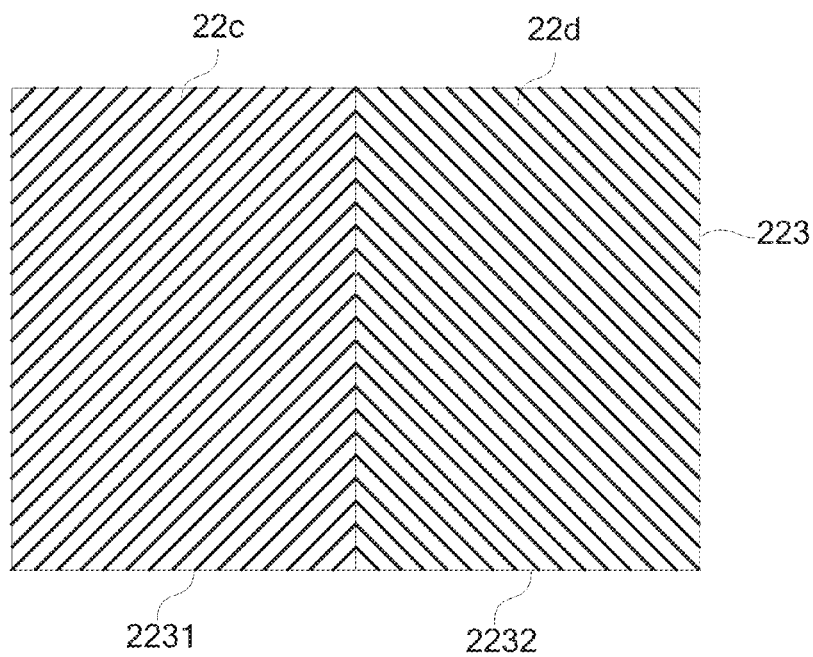
FIG. 8 illustrates a top view of another exemplary second regionalized polarizing film according to the disclosed embodiments.

FIG. 8 illustrates a top view of another exemplary second regionalized polarizing film according to the present disclosure. Referring to FIG. 8, in one embodiment, the second regionalized polarizing film 2 may include a flexible substrate and a regionalized polarizing layer 223 configured on the flexible substrate. The regionalized polarizing layer 223 may have two different polarization directions, an eighth polarization direction 22c, and a ninth polarization direction 22d. That is, the second regionalized polarizing film 2 may include an eighth region 2231 having the eighth polarization direction 22c, and a ninth region 2232 having the ninth polarization direction 22d.

In one embodiment, the eighth polarization direction 22c of the second regionalized polarizing film 2 may be same as the third polarization direction 12c of the first regionalized polarizing film 1, and the ninth polarization direction 22d of the second regionalized polarizing film 2 may be same as the fifth polarization direction 12e of the first regionalized polarizing film 1. When the second regionalized polarizing film 2 and the first regionalized polarizing film 1 are bonded and used together, the second regionalized polarizing film 2 and the first regionalized polarizing film 1 may have coordinated polarization directions such that the eighth polarization direction 22c of the second regionalized polarizing film 2 may be parallel with the third polarization direction 12c of the first regionalized polarizing film 1, and the ninth polarization direction 22d of the second regionalized polarizing film 2 may be parallel with the fifth polarization direction 12e of the first regionalized polarizing film 1.

Because the eighth region 2231 of the second regionalized polarizing film 2 and the third region 1221 of the first regionalized polarizing film 1 are coordinated, a light passing through the eighth region 2231 of the second regionalized polarizing film 2 with a polarization direction parallel with the third polarization direction 12c of the first regionalized polarizing film 1 may pass through the third region 1221 of the first regionalized polarizing film 1 to illuminate and display an image corresponding to the third region 1221 of the first regionalized polarizing film 1. Because the ninth region 2232 of the second regionalized polarizing film 2 and the fifth region 1223 of the first regionalized polarizing film 1 are coordinated, a light passing through the ninth region 2232 of the second regionalized polarizing film 2 with a polarization direction parallel with the fifth polarization direction 12e of the first regionalized polarizing film 1 may pass through the fifth region 1223 of the first regionalized polarizing film 1 to illuminate and display an image corresponding to the fifth region 1223 of the first regionalized polarizing film 1.

In the meantime, the fourth polarization direction 12d of the first regionalized polarizing film 1 may be different from the eighth polarization direction 22c or the ninth polarization direction 22d of the second regionalized polarizing film 2. The fourth polarization direction 12d of the first regionalized polarizing film 1 may form a certain angle with the eighth polarization direction 22c or the ninth polarization direction 22d of the second regionalized polarizing film 2. Thus, a light passing through the second regionalized polarizing film 2 may be blocked by the fourth region 1222 of the first regionalized polarizing film 1, and the image corresponding to the fourth region 1222 may not be illuminated or displayed.

In another embodiment, the first regionalized polarizing film 1 as shown in FIG. 7 and the second regionalized polarizing film 2 as shown in FIG. 5 may be bonded and used together. The sixth polarization direction 22a of the second regionalized polarizing film 2 may be same as the fourth polarization direction 12d of the first regionalized polarizing film 1. When the second regionalized polarizing film 2 and the first regionalized polarizing film 1 are bonded and used together, the second regionalized polarizing film 2 and the first regionalized polarizing film 1 may have coordinated polarization directions such that the sixth polarization direction 22a of the second regionalized polarizing film 2 may be parallel with the fourth polarization direction 12d of the first regionalized polarizing film 1.

Because the sixth polarization direction 22a of the second regionalized polarizing film 2 is same as the fourth polarization direction 12d of the first regionalized polarizing film 1, a light passing through the second regionalized polarizing film 2 with a polarization direction parallel with the fourth polarization direction 12d of the first regionalized polarizing film 1 may pass through the fourth region 1222 of the first regionalized polarizing film 1 to illuminate and display an image corresponding to the fourth region 1222 of the first regionalized polarizing film 1.

In the meantime, the third polarization direction 12c and the fifth polarization direction 12e of the first regionalized polarizing film 1 may be different from the sixth polarization direction 22a of the second regionalized polarizing film 2. The third polarization direction 12c and the fifth polarization direction 12e of the first regionalized polarizing film 1 may form a certain angle with the sixth polarization direction 22a of the second regionalized polarizing film 2. Thus, a light passing through the second regionalized polarizing film 2 may be blocked by the third region 1221 and the fifth region 1223 of the first regionalized polarizing film 1, and the image corresponding to the third region 1221 and the fifth region 1223 may not be illuminated or displayed.

In one embodiment, the flexible substrate may be made of polyimide or polyimethylsiloxane, providing sufficient flexibility for the first regionalized polarizing film 1 and the second regionalized polarizing film 2. The regionalized polarizing layer may be made of polymer doped with a dichroic organic dye. The dichroic organic dye may have a dichroic ratio greater than 7. The dichroic organic dye may be an azo dye, an anthraquinone dye, a biphenyl dye, a triphenylmethane diazinon and derivative dye, a single methine or multi-methine dye, or a polycyclic dye. The dichroic organic dye may be mixed with a polymer, such as a heat resistant polyimide.

In other embodiments, the first regionalized polarizing film 1 may have at least two different polarization directions. When the first regionalized polarizing film 1 is coordinated with the second regionalized polarizing films 2 with preconfigured polarization directions, different images may be illuminated and displayed. That is, the angles α between any two adjacent polarization directions of the first regionalized polarizing film 1 are greater than 1°. The angles between any two adjacent polarization directions of the third polarization direction 12c, the fourth polarization direction 12d, and the fifth polarization direction 12e may be greater than 1°.

At the same time, the adjacent polarization directions of the first regionalized polarizing film 1 may be separated evenly by an angle α=180°/n, wherein n is the total number of polarization directions of the first regionalized polarizing film 1. That is, the adjacent polarization directions of the first regionalized polarizing film 1 are evenly separated by an angle as large as possible. When the first regionalized polarizing film 1 and the second regionalized polarizing film 2 are boned and used together, each polarization direction of the first regionalized polarizing film 1 may properly coordinate with the polarization direction of the second regionalized polarizing film 2. Within the tolerance of the bonding precision, only the image in the target regions may be illuminated and displayed.

Unlike the polarizing films formed by stretching, the first regionalized polarizing film 1 and the second regionalized polarizing film 2 may be formed by irradiating polarized ultra violet light onto a polymer film coated over the flexible substrate to form different polarization directions in different regions. No additional protective film or adhesive layer may be needed. Thus, the reliability of the regionalized polarizing layer may be improved, and overall thickness of the regionalized polarizing layer may be reduced. At the same time, by coordinating the polarization directions of the first regionalized polarizing film 1 and the second regionalized polarizing film 2, the conversion film may provide desired image on the electronic device according to user preference. The easy change of the images makes the conversion film interesting and affordable.

Figure 9:
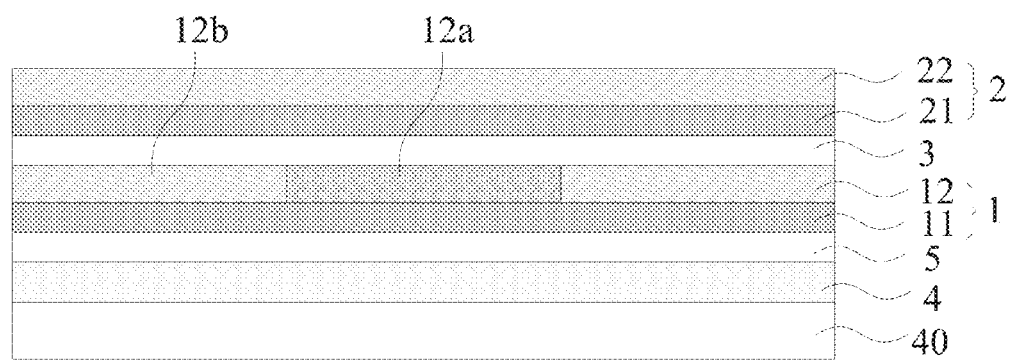
FIG. 9 illustrates a cross-sectional view of an exemplary electronic device according to the disclosed embodiments.

FIG. 9 illustrates a cross-sectional view of an exemplary electronic device according to the present disclosure. Referring to FIG. 9, the electronic device may include a main body 40. The main body may be cell phones, notebook computers, MP3 players or digital cameras, etc.

Generally, an image layer 4 may be configured on the main body 40. The image layer 4 may be graphic patterns, colors or texts, etc. A conversion film may be configured on the main body 40. The conversion film may be bonded together with the main body 40 by a second adhesive layer 5.

The conversion film may include a first regionalized polarizing film 1 and a second regionalized polarizing film 2 configured on the first regionalized polarizing film 1. A first adhesive layer 3 may be configured between the first regionalized polarizing film 1 and the second regionalized polarizing film 2 to bond the first regionalized polarizing film 1 and the second regionalized polarizing film 2 together.

In order to replace the second regionalized polarizing film 2 easily, the second adhesive layer 5 may have a viscosity coefficient smaller than that of the first adhesive layer 3. The first adhesive layer 3 may have a peel strength greater than about 80 g/cm. The second adhesive layer 5 may have a peel strength between about 20 g/cm and about 50 g/cm. When the second regionalized polarizing film 2 is removed, the rest of the conversion film may remain on the main body 40. Only the second regionalized polarizing film 2 is removed. The first adhesive layer 3 and the second adhesive layer 5 may be made of one or more of urea-formaldehyde glue, epoxy glue, polyacrylate glue, and polyvinyl acetate emulsion.

The first regionalized polarizing film 1 may include a flexible substrate 11 and a regionalized polarizing layer 12 configured on the flexible substrate 11. The regionalized polarizing layer 12 may have at least two different polarization directions. In one embodiment, the regionalized polarizing layer 12 may have two different polarization directions. Similarly, the second regionalized polarizing film 2 may include a flexible substrate 21 and a regionalized polarizing layer 22 configured on the flexible substrate 21.

In one embodiment, the flexible substrate may be made of polyimide or polymethylsiloxane, providing sufficient flexibility for the first regionalized polarizing film 1 and the second regionalized polarizing film 2. The regionalized polarizing layer may be made of polymer doped with a dichroic organic dye. The dichroic organic dye may be an organic dye displaying different colors due to different light absorption levels along the long axis and the short axis of organic dye molecules. The dichroic organic dye may have a dichroic ratio greater than 7. The dichroic organic dye may be an azo dye, an anthraquinone dye, a biphenyl dye, a triphenylmethane diazinon and derivative dye, a single methine or multi-methine dye, or a polycyclic dye. The dichroic organic dye may be mixed with a polymer, such as a heat resistant polyimide.

When being irradiated by a polarized ultra violet light, the imide groups of the polymer molecules may be excited to produce free radicals, causing the polymer to degrade. In the polarization direction of the polarized ultra violet light, the imide groups of polymer molecules may be broken down. In the direction perpendicular to the polarization direction of the polarized ultra violet light, the polymer molecules may still have a large number of unbroken imide groups. Driven by the Van der Waals forces, the polymer molecules may obtain an alignment direction perpendicular to the polarization direction of the polarized ultra violet light. The alignment of the polyimide polymer molecules may further cause the orderly alignment of the dichroic dye molecules mixed into the polyimide polymer. Because the dichroic organic dye molecules have different light permeability levels in the long axis and short axis, the polarization direction of the regionalized polarizing layer may be obtained.

Figure 10:
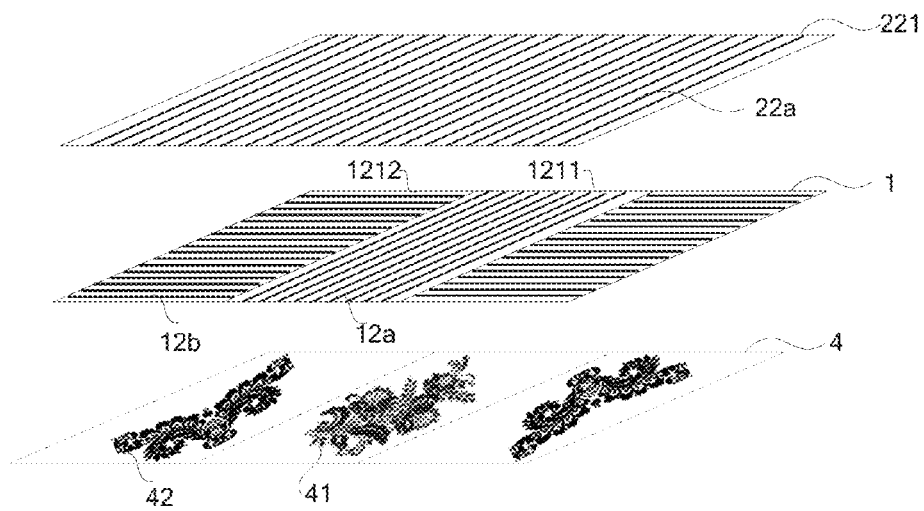
FIG. 10 illustrates a schematic view of an exemplary electronic device according to the disclosed embodiments.

FIG. 10 illustrates a schematic view of an exemplary electronic device according to the present disclosure. Referring to FIG. 10, the regionalized polarizing layer 12 of the first regionalized polarizing film 1 may have two different polarization directions, a first polarization direction 12a and a second polarization direction 12b. That is, the first regionalized polarizing film 1 may include a first region 1211 having the first polarization direction 12a and a second region 1212 having the second polarization direction 12b.

In one embodiment, the first polarization direction 12a may be substantially perpendicular to the second polarization direction 12b. That is, the two adjacent polarization directions of the first regionalized polarizing film 1 may form an angle α at about 90°. The image layer 4 may include a first image region 41 corresponding to the first region 1211 of the first regionalized polarizing film 1 and a second image region 42 corresponding to the second region 1212 of the first regionalized polarizing film 1.

The regionalized polarizing layer 221 of the second regionalized polarizing film 2 may have a sixth polarization direction 22a same as the first polarization direction 12a of the first regionalized polarizing film 1. In one embodiment, when the second regionalized polarizing film 2 and the first regionalized polarizing film 1 are bonded and used together, the second regionalized polarizing film 2 and the first regionalized polarizing film 1 may have coordinated polarization directions such that the sixth polarization direction 22a of the second regionalized polarizing film 2 may be parallel with the first polarization direction 12a of the first regionalized polarizing film 1. Because the sixth polarization direction 22a of the second regionalized polarizing film 2 is same as the first polarization direction 12a of the first regionalized polarizing film 1, a light passing through the second regionalized polarizing film 2 with a polarization direction parallel with the first polarization direction 12a of the first regionalized polarizing film 1 may pass through the first region 1211 of the first regionalized polarizing film 1 to illuminate and display the first image region 41 corresponding to the first region 1211 of the first regionalized polarizing film 1.

Figure 11:
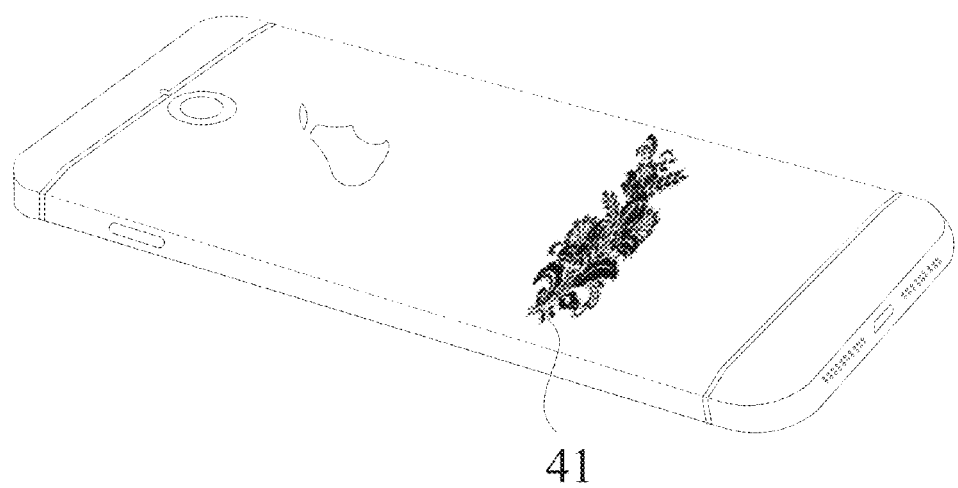
FIG. 11 illustrates a schematic view of using the electronic device shown in FIG. 10.

FIG. 11 illustrates a schematic view of using the electronic device shown in FIG. 10. Referring to FIG. 11, the electronic device may display the graphic pattern in the first image region 41 of the image layer 4.

In the meantime, the second polarization direction 12b of the first regionalized polarizing film 1 may be substantially perpendicular to the sixth polarization direction 22a of the second regionalized polarizing film 2. The second polarization direction 12b of the first regionalized polarizing film 1 may form an angle at about 90° with the sixth polarization direction 22a of the second regionalized polarizing film 2. Thus, a light passing through the second regionalized polarizing film 2 may be blocked by the second region 1212 of the first regionalized polarizing film 1, and the second image region 42 corresponding to the second region 1212 may not be displayed.

Figure 12:
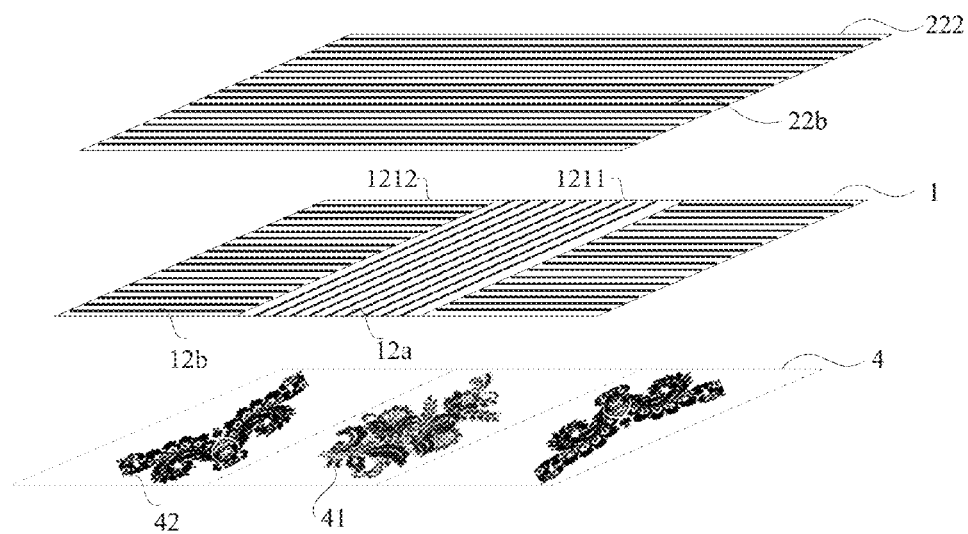
FIG. 12 illustrates a schematic view of another exemplary electronic device according to the disclosed embodiments.

FIG. 12 illustrates a schematic view of another exemplary electronic device according to the present disclosure. Referring to FIG. 12, in one embodiment, the regionalized polarizing layer and the image layer of the first regionalized polarizing film 1 may be same as the regionalized polarizing layer and the image layer of the first regionalized polarizing film 1 as shown in FIG. 10.

The regionalized polarizing layer 12 of the first regionalized polarizing film 1 may have two different polarization directions, the first polarization direction 12a and the second polarization direction 12b. That is, the first regionalized polarizing film 1 may include a first region 1211 having the first polarization direction 12a and a second region 1212 having the second polarization direction 12b.

In one embodiment, the first polarization direction 12a may be substantially perpendicular to the second polarization direction 12b. That is, the two adjacent polarization directions of the first regionalized polarizing film 1 may form an angle α at about 90°. The image layer 4 may include the first image region 41 corresponding to the first region 1211 of the first regionalized polarizing film 1 and the second image region 42 corresponding to the second region 1212 of the first regionalized polarizing film 1.

The regionalized polarizing layer 222 of the second regionalized polarizing film 2 may have a seventh polarization direction 22b same as the second polarization direction 12b of the first regionalized polarizing film 1. In one embodiment, when the second regionalized polarizing film 2 and the first regionalized polarizing film 1 are bonded and used together, the second regionalized polarizing film 2 and the first regionalized polarizing film 1 may have coordinated polarization directions such that the seventh polarization direction 22b of the second regionalized polarizing film 2 may be parallel with the second polarization direction 12b of the first regionalized polarizing film 1. Because the seventh polarization direction 22b of the second regionalized polarizing film 2 is same as the second polarization direction 12b of the first regionalized polarizing film 1, a light passing through the second regionalized polarizing film 2 with a polarization direction parallel with the second polarization direction 12b of the first regionalized polarizing film 1 may pass through the second region 1212 of the first regionalized polarizing film 1 to illuminate and display the second image region 42 corresponding to the second region 1212 of the first regionalized polarizing film 1.

Figure 13:
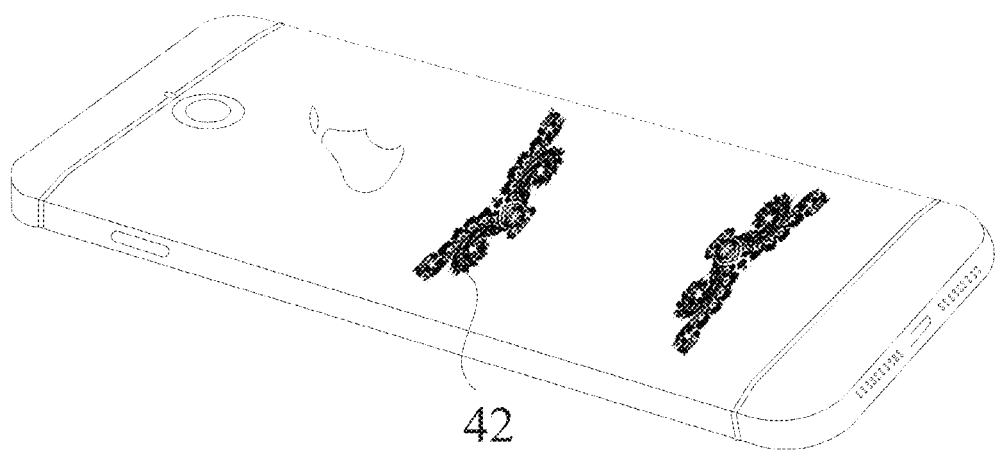
FIG. 13 illustrates a schematic view of using the electronic device shown in FIG. 12.

FIG. 13 illustrates a schematic view of using the electronic device shown in FIG. 12. Referring to FIG. 13, the electronic device may display the graphic pattern in the second image region 42 of the image layer 4.

In the meantime, the first polarization direction 12a of the first regionalized polarizing film 1 may be substantially perpendicular to the seventh polarization direction 22b of the second regionalized polarizing film 2. The first polarization direction 12a of the first regionalized polarizing film 1 may form an angle at about 90° with the seventh polarization direction 22b of the second regionalized polarizing film 2. Thus, a light passing through the second regionalized polarizing film 2 may be blocked by the first region 1211 of the first regionalized polarizing film 1, and the first image region 41 corresponding to the first region 1211 may not be displayed.

In another embodiment, the first regionalized polarizing film 1 may have at least two different polarization directions. When the first regionalized polarizing film 1 is coordinated with the second regionalized polarizing films 2 with pre-configured polarization directions, different images may be illuminated and displayed. That is, the angles α between any two adjacent polarization directions of the first regionalized polarizing film 1 must be greater than 1°. The first polarization direction 12a and the second polarization direction 12b may form any angle α as long as α>1°.

Further, the main body 40 of the electronic device may be the exterior of the electronic device or the protective case mounted on the electronic device.

The first regionalized polarizing film 1 and the second regionalized polarizing film 2 may be formed by irradiating polarized ultra violet light onto a polymer film coated over the flexible substrate to form different polarization directions in different regions. No additional protective film or adhesive layer may be needed. Thus, the reliability of the regionalized polarizing layer may be improved, and overall thickness of the regionalized polarizing layer may be reduced. At the same time, by coordinating the polarization directions of the first regionalized polarizing film 1 and the second regionalized polarizing film 2, the conversion film may provide desired image on the electronic device according to user preference. The easy change of the images makes the conversion film interesting and affordable.

Figure 16:
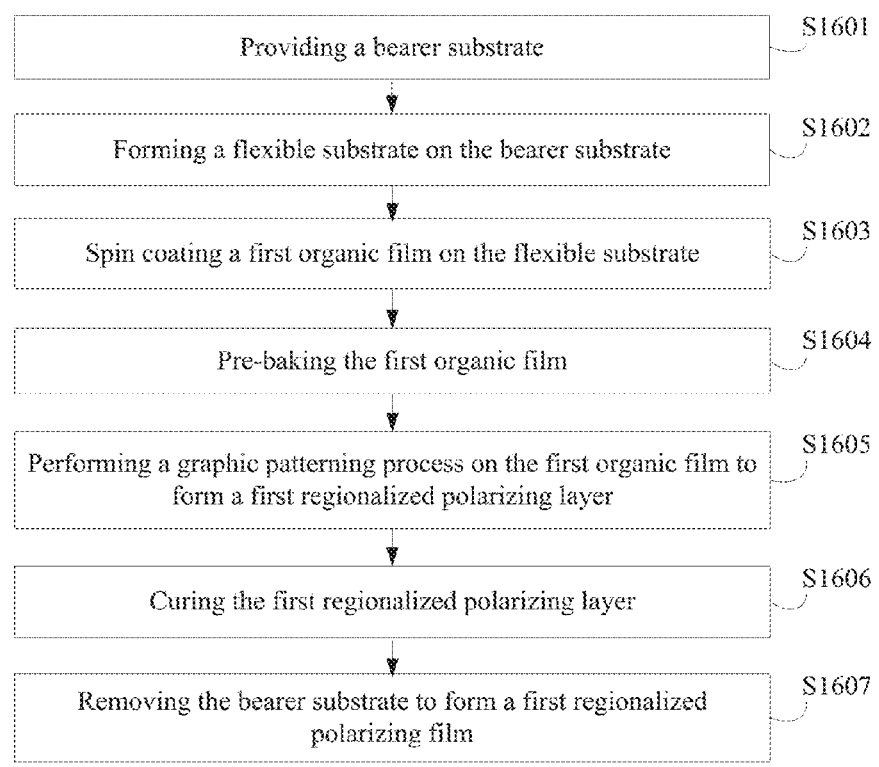
FIG. 16 illustrates a flow chart of an exemplary method for fabricating the first regionalized polarizing layer film according to the disclosed embodiments.

The present disclosure provides a method for fabricating the conversion film described above. FIG. 16 illustrates a flow chart of an exemplary method for fabricating the first regionalized polarizing film according to the present disclosure. FIGS. 14a-14f illustrate different stages of an exemplary method for fabricating a first regionalized polarizing film according to the present disclosure. Referring to FIG. 16, the fabrication method may include the following steps.

Figure 14:
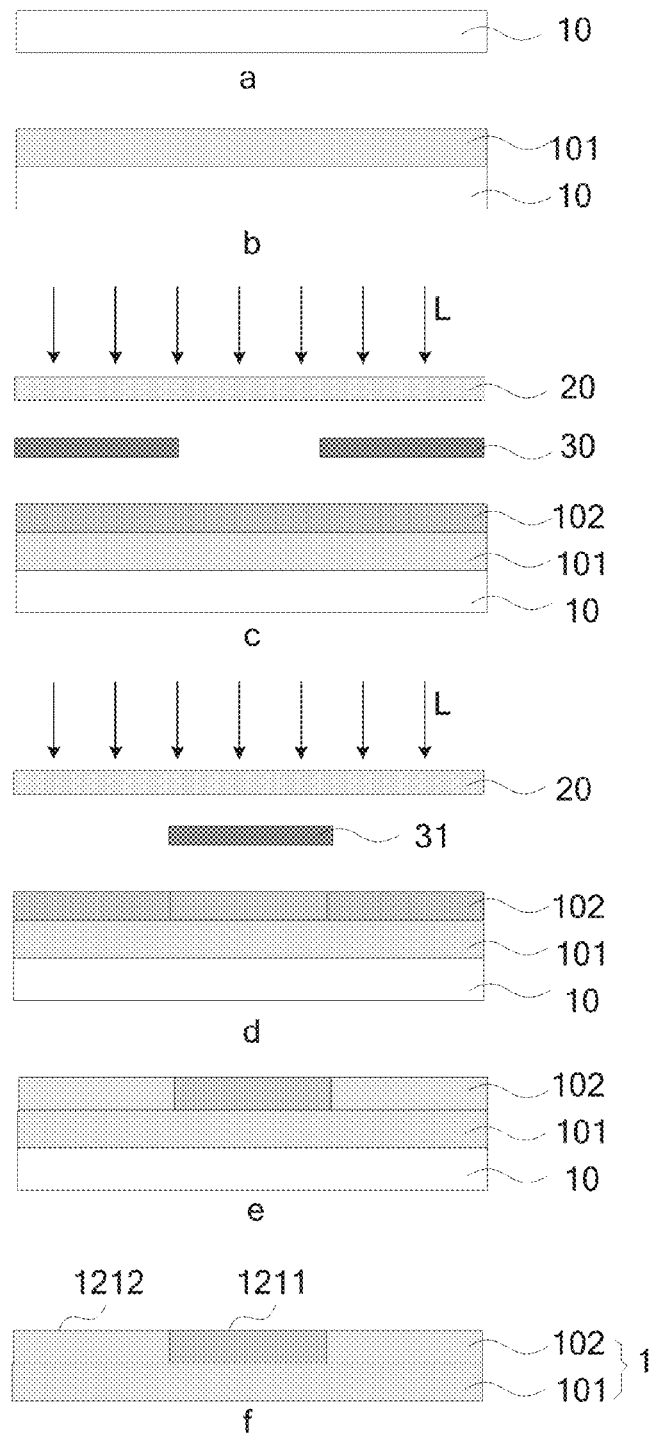
FIGS. 14a-14f illustrate different stages of an exemplary method for fabricating a first regionalized polarizing film according to the disclosed embodiments.

Step S1601: providing a bearer substrate. Specifically, a bearer substrate 10 may be provided as shown in FIG. 14a. The bearer substrate 10 may be a glass substrate or a resin substrate.

Step S1602: forming a flexible substrate on the bearer substrate.

Specifically, a polyimide solution may be coated over the bearer substrate 10. The coated bearer substrate 10 may be pre-baked. The pre-baking temperature may be approximately between 90° C. and 130° C. The pre-baking time may be approximately between 90 seconds and 120 seconds.

The polyimide layer may be irradiated by an ultra violet light. The ultra violet light may have an intensity level approximately between 1000 mj and 3000 mj. The polyimide layer may be cured by a high temperature baking. The baking temperature may be approximately between 210° C. and 230° C. The baking time may be approximately between 20 minutes and 50 minutes. A flexible substrate 101 may be formed, as shown in FIG. 14b. In addition to polyimide, the flexible substrate 101 may also be made of polydimethylsiloxane.

Step S1603: spin coating a first organic film on the flexible substrate.

Specifically, a first organic film 102 may be spin coated over the flexible substrate 101, as shown in FIG. 14c. The first organic film 102 may be made of polymer doped with a dichroic organic dye. The dichroic organic dye may be an organic dye displaying different colors due to different light absorption levels along the long axis and the short axis of organic dye molecules. The dichroic organic dye may have a dichroic ratio greater than 7. The dichroic organic dye may be an azo dye, an anthraquinone dye, a biphenyl dye, a triphenylmethane diazinon and derivative dye, a single methine or multi-methine dye, or a polycyclic dye. The dichroic organic dye may be mixed with a polymer, such as a heat resistant polyimide.

Step S1604: pre-baking the first organic film.

Specifically, the first organic film 102 may be pre-baked. The pre-baking temperature may be approximately between 90° C. and 130° C. The pre-baking time may be approximately between 90 seconds and 120 seconds.

Step S1605: performing a graphic patterning process on the first organic film to form a first regionalized polarizing layer.

Specifically, a polarizer 20 may be provided. The polarizer 20 may be a metal grating polarizer with a pre-configured polarization direction. An ultra violet light L may pass through the polarizer 20 to produce a polarized ultra violet light. The ultra violet light L may have an intensity level approximately between 800 mj and 1000 mj. The polarized ultra violet light may pass through a first mask 30 to irradiate the first organic film 102 to perform a graphic patterning process. As shown in FIG. 14c, a polarizing region having a first polarization direction may be formed in the region of the first organic film 102 exposed by the first mask 30.

Next, the polarizer 20 may be rotated by an angle. The ultra violet light L may pass through the polarizer 20 rotated by an angle to produce a polarized ultra violet light with a different polarization direction. The polarized ultra violet light may pass through a second mask 31 to irradiate the first organic film 102 to perform a graphic patterning process. As shown in FIG. 14d, another polarizing region having a second polarization direction may be formed in the region of the first organic film 102 exposed by the second mask 31.

The graphic patterning process may be repeated until all the polarizing regions are formed. In such way, a first regionalized polarizing layer 102 may be formed.

Step S1606: curing the first regionalized polarizing layer.

Specifically, the first regionalized polarizing layer 102 may be cured by a high temperature baking. The baking temperature may be approximately between 210° C. and 230° C. The baking time may be approximately between 20 minutes and 50 minutes. In one embodiment, the first mask 30 and the second mask 31 may have complementary blocked regions. In other embodiments, the mask design may be different, depending on the design specification of the polarizing regions of the first regionalized polarizing layer 102.

In one embodiment, the first regionalized polarizing layer 102 may include a first region 1211 having the first polarization direction and a second region 1212 having the second polarization direction. The first polarization direction and the second polarization direction may be perpendicular to each other.

Step S1607: removing the bearer substrate to form a first regionalized polarizing film.

Specifically, the bearer substrate 10 may be removed. Laser cutting or spinning blade cutting may be used to cut off the edges of the bearer substrate 10. Warm water may be used to rinse the bearer substrate 10 to separate the flexible substrate 101 from the bearer substrate 10. Thus, a first regionalized polarizing film 1 may be formed as shown in FIG. 14f.

In another embodiment, the first regionalized polarizing film 1 may include a third region, a fourth region, and a fifth region. A polarized ultra violet light with a pre-configured polarization direction may be irradiated through a third mask on the first organic film to form the third region having a third polarization direction. A different polarized ultra violet light with a polarization direction rotated by an angle may be irradiated through a fourth mask on the first organic film to form the fourth region having a fourth polarization direction. A different polarized ultra violet light with a polarization direction further rotated by another angle may be irradiated through a fifth mask on the first organic film to form the fifth region having a fifth polarization direction. The angles between any two adjacent polarization directions of the third polarization direction, the fourth polarization direction, and the fifth polarization direction may be 60°.

The second regionalized polarizing film 2 may have a fabrication method similar to the fabrication method of the first regionalized polarizing film 1. The method for fabricating the second regionalized polarizing film 2 may include the following steps.

A bearer substrate may be provided. The bearer substrate may be a glass substrate or a resin substrate.

Next, a polyimide solution may be coated over the bearer substrate. The coated bearer substrate may be pre-baked. The pre-baking temperature may be approximately between 90° C. and 130° C. The pre-baking time may be approximately between 90 seconds and 120 seconds.

The polyimide layer may be irradiated by an ultra violet light. The ultra violet light may have an intensity level approximately between 1000 mj and 3000 mj. The polyimide layer may be cured by a high temperature baking. The baking temperature may be approximately between 210° C. and 230° C. The baking time may be approximately between 20 minutes and 50 minutes. A flexible substrate may be formed. In addition to polyimide, the flexible substrate may also be made of polydimethylsiloxane.

Next, a second organic film may be spin coated over the flexible substrate 101. The second organic film may be made of polymer doped with a dichroic organic dye. The dichroic organic dye may be an organic dye displaying different colors due to different light absorption levels along the long axis and the short axis of organic dye molecules. The dichroic organic dye may have a dichroic ratio greater than 7. The dichroic organic dye may be an azo dye, an anthraquinone dye, a biphenyl dye, a triphenylmethane diazinon and derivative dye, a single methine or multi-methine dye, or a polycyclic dye. The dichroic organic dye may be mixed with a polymer, such as a heat resistant polyimide.

The second organic film may be pre-baked. The pre-baking temperature may be approximately between 90° C. and 130° C. The pre-baking time may be approximately between 90 seconds and 120 seconds.

Next, a polarizer may be provided. The polarizer may be a metal grating polarizer with a pre-configured polarization direction. An ultra violet light L may pass through the polarizer to produce a polarized ultra violet light. The ultra violet light L may have an intensity level approximately between 800 mj and 1000 mj. The polarized ultra violet light may pass through a sixth mask to irradiate the second organic film to perform a graphic patterning process. A polarizing region having a sixth polarization direction may be formed in the region of the second organic film exposed by the sixth mask. The graphic patterning process may be repeated until all the polarizing regions are formed. In such way, a second regionalized polarizing layer may be formed.

The polarization direction of the second regionalized polarizing layer may be same as one of the polarization directions of the first regionalized polarizing layer. In one embodiment, the sixth polarization direction of the second regionalized polarizing layer may be same as the first polarization direction of the first regionalized polarizing layer.

Next, the second regionalized polarizing layer may be cured by a high temperature baking. The baking temperature may be approximately between 210° C. and 230° C. The baking time may be approximately between 20 minutes and 50 minutes.

Next, the bearer substrate may be removed. Laser cutting or spinning blade cutting may be used to cut off the edges of the bearer substrate. Warm water may be used to rinse the bearer substrate to separate the flexible substrate from the bearer substrate. Thus, a second regionalized polarizing film 2 may be formed.

In another embodiment, the second regionalized polarizing film 2 may include at least two polarization directions. After the region having the sixth polarization direction is formed in the region of the second organic film exposed by the sixth mask, the bearer substrate may be rotated by an angle. The polarized ultra violet light may be irradiated through a seventh mask to perform a graphic patterning process. A polarizing region having a seventh polarization direction may be formed in the region of the second organic film exposed by the seventh mask. The graphic patterning process may be repeated until all the polarizing regions are formed. In such way, a second regionalized polarizing layer may be formed.

In one embodiment, the sixth mask and the seventh mask may have complementary blocked regions. In other embodiments, the mask design may be different, depending on the design specification of the polarizing regions of the second regionalized polarizing layer.

Figure 17:
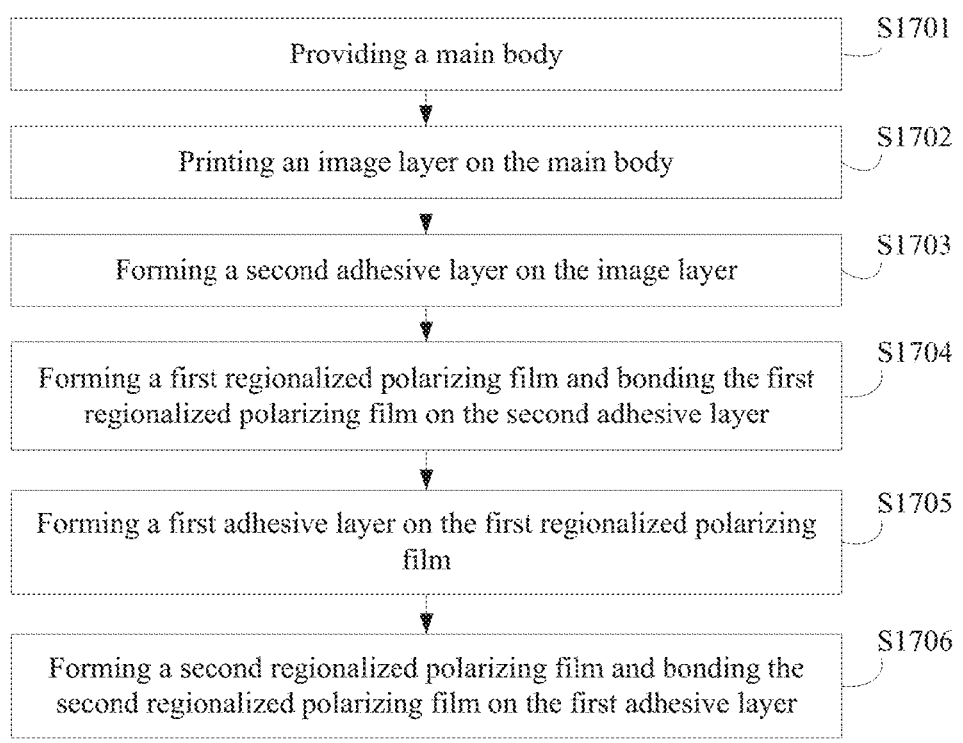
FIG. 17 illustrates a flow chart of an exemplary method for fabricating the electronic device according to the disclosed embodiments.

The present disclosure provides a method for fabricating the electronic device described above. FIG. 17 illustrates a flow chart of an exemplary method for fabricating the electronic device according to the present disclosure. FIGS. 15a-15f illustrate different stages of an exemplary method for fabricating an electronic device according to the present disclosure. Referring to FIG. 17, the fabrication method may include the following steps.

Figure 15:
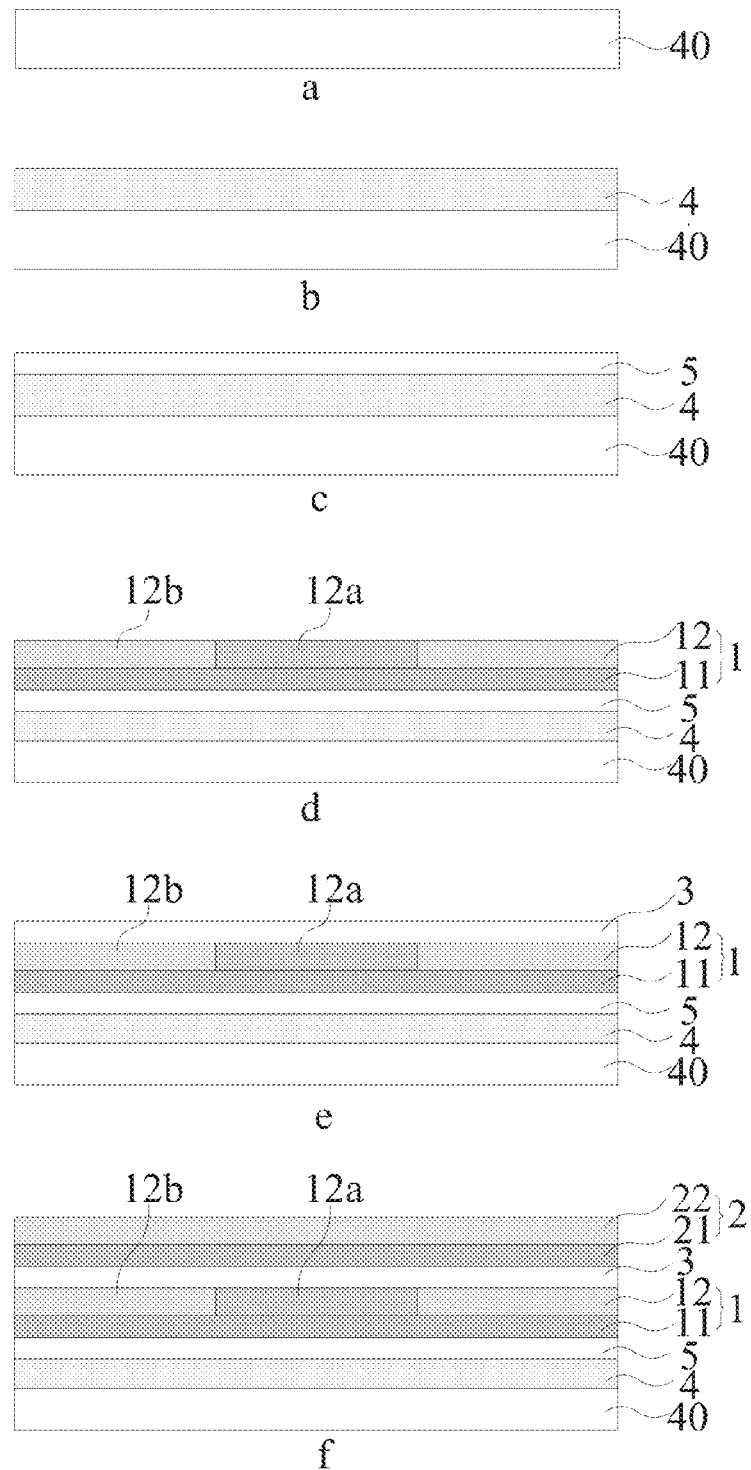
FIGS. 15a-15f illustrate different stages of an exemplary method for fabricating an electronic device according to the disclosed embodiments.

Step S1701: providing a main body. Specifically, a main body 40 may be provided as shown in FIG. 15a. The main body 40 may be a cell phone, a notebook computer, a MP3 player or a digital camera, etc.

Step S1702: printing an image layer on the main body. Specifically, an image layer 4 may be printed on the main body 40, as shown in FIG. 15b. The image layer 4 may include graphic patterns, color, and texts, etc. In addition to printing, other processes may be used to form the image layer 4.

Step S1703: forming a second adhesive layer on the image layer. Specifically, a second adhesive layer 5 may be formed on the image layer 4, as shown in FIG. 15c.

Step S1704: forming a first regionalized polarizing film and bonding the first regionalized polarizing film on the second adhesive layer.

Specifically, a first regionalized polarizing film 1 may be formed by using the fabrication method described above. The first regionalized polarizing film 1 may include a flexible substrate 11 and a polarizing layer 12. The first regionalized polarizing film 1 may be bonded to the second adhesive layer 5, as shown in FIG. 15d. The first regionalized polarizing film 1 may have at least two polarization directions. In one embodiment, the first regionalized polarizing film 1 may have two polarization directions, a first polarization direction 12a and a second polarization direction 12b.

Step S1705: forming a first adhesive layer on the first regionalized polarizing film. Specifically, a first adhesive layer 3 may be formed on the first regionalized polarizing film 1, as shown in FIG. 15e.

Step S1706: forming a second regionalized polarizing film and bonding the second regionalized polarizing film on the first adhesive layer.

Specifically, a second regionalized polarizing film 2 may be formed by using the fabrication method described above. The second regionalized polarizing film 2 may include a flexible substrate 21 and a polarizing layer 22. The second regionalized polarizing film 2 may be bonded to the first adhesive layer 3, as shown in FIG. 15f. The second regionalized polarizing film 2 may have at least one polarization direction. In one embodiment, the second regionalized polarizing film 2 may have one polarization direction.

The polarization direction of the second regionalized polarizing film 2 may be same as one of the polarization directions of the first regionalized polarizing film 1. When the second regionalized polarizing film 2 and the first regionalized polarizing film 1 are bonded and used together, the second regionalized polarizing film 2 and the first regionalized polarizing film 1 may have coordinated polarization directions such that the polarization direction of the second regionalized polarizing film 2 may be parallel with one of the polarization directions of the first regionalized polarizing film 1.

Further, in order to replace the second regionalized polarizing film 2 easily, the second adhesive layer 5 may have a viscosity coefficient smaller than that of the first adhesive layer 3. The first adhesive layer 3 may have a peel strength greater than about 80 g/cm. The second adhesive layer 5 may have a peel strength between about 20 g/cm and about 50 g/cm. When the second regionalized polarizing film 2 is removed, the rest of the conversion film may remain on the main body 40. Only the second regionalized polarizing film 2 is removed. The first adhesive layer 3 and the second adhesive layer 5 may be made of one or more of urea-formaldehyde glue, epoxy glue, polyacrylate glue, and polyvinyl acetate emulsion.

Unlike the polarizing films formed by stretching, the first regionalized polarizing film 1 and the second regionalized polarizing film 2 may be formed by irradiating polarized ultra violet light onto a polymer film coated over the flexible substrate to form different polarization directions in different regions. No additional protective film or adhesive layer may be needed. Thus, the reliability of the regionalized polarizing layer may be improved, and overall thickness of the regionalized polarizing layer may be reduced. At the same time, by coordinating the polarization directions of the first regionalized polarizing film 1 and the second regionalized polarizing film 2, the conversion film may provide desired image on the electronic device according to user preference.

The easy change of the images makes the conversion film interesting and affordable.

The specification above provides detailed descriptions of the conversion film and the fabrication method thereof as well as the electronic device and the fabrication method thereof according to the present disclosure. Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A method for fabricating an electronic device, comprising:
   providing a main body;
   printing an image layer on the main body;
   forming a second adhesive layer on the image layer;
   forming a first regionalized polarizing film and bonding the first regionalized polarizing film on the second adhesive layer;
   forming a first adhesive layer on the first regionalized polarizing film; and
   forming a second regionalized polarizing film and bonding the second regionalized polarizing film on the first adhesive layer,
   wherein:
   the first regionalized polarizing film has at least two different polarization directions;
   the second regionalized polarizing film has at least one polarization direction; and
   the at least one polarization direction of the second regionalized polarizing film is same as one of the at least two different polarization directions of the first regionalized polarizing film,
   wherein forming the first or the second regionalized polarizing film includes:
   providing a bearer substrate;
   forming a flexible substrate on the bearer substrate;
   spin coating an organic film on the flexible substrate;
   pre-baking the organic film;
   performing a graphic patterning process on the organic film to form a regionalized polarizing layer;
   curing the regionalized polarizing layer; and
   removing the bearer substrate to form the regionalized polarizing film.

2. The fabrication method of claim 1, wherein the graphic patterning process includes:
   providing a polarizer;
   passing an ultra violet light through the polarizer to produce a polarized ultra violet light;
   irradiating the organic film through a mask to form a region having a polarization direction on the organic film;
   rotating the polarizer by an angle;
   passing an ultra violet light through the rotated polarizer to produce a different polarized ultra violet light;
   irradiating the organic film through a different mask to form a different region having a different polarization direction on the organic film; and
   repeating the above steps until all the regions on the organic film are formed and the regionalized polarizing layer is formed,
   wherein:
   the angles α between any two adjacent polarization directions of the regionalized polarizing layer are greater than 1°; and
   the angles α between any two adjacent polarization directions of the regionalized polarizing layer are 180°/n, wherein n is a total number of polarization directions of the regionalized polarizing layer.

3. The fabrication method of claim 2, wherein forming the regionalized polarizing layer of the first regionalized polarizing film includes:
   providing a polarizer;
   passing an ultra violet light through the polarizer to produce a polarized ultra violet light;
   irradiating the organic film through a first mask to form a first region having a first polarization direction on the organic film;
   rotating the polarizer by an angle at about 90°;
   passing an ultra violet light through the rotated polarizer to produce a different polarized ultra violet light; and
   irradiating the organic film through a second mask to form a second region having a second polarization direction on the organic film,
   wherein:
   the regionalized polarizing layer of the first regionalized polarizing film has the first region and the second region; and
   the angle between the first polarization direction and the second polarization direction is about 90°.

4. The fabrication method of claim 2, wherein forming the regionalized polarizing layer of the first regionalized polarizing film includes:
   providing a polarizer;
   passing an ultra violet light through the polarizer to produce a polarized ultra violet light;
   irradiating the organic film through a third mask to form a third region having a third polarization direction on the organic film;
   rotating the polarizer by an angle at about 60°;
   passing an ultra violet light through the rotated polarizer to produce a different polarized ultra violet light;
   irradiating the organic film through a fourth mask to form a fourth region having a fourth polarization direction on the organic film,
   rotating the polarizer by another angle at about 60°;
   passing an ultra violet light through the rotated polarizer to produce a different polarized ultra violet light; and
   irradiating the organic film through a fifth mask to form a fifth region having a fifth polarization direction on the organic film,
   wherein:
   the regionalized polarizing layer of the first regionalized polarizing film has the third region, the fourth region and the fifth region; and
   the angles between any two adjacent polarization directions of the regionalized polarizing layer of the first regionalized polarizing film are about 60°.

5. The fabrication method of claim 2, wherein:
   the ultra violet light in the graphic patterning process has an intensity level approximately between 800 millijoule (mj) and 1000 millijoule (mj); and
   the ultra violet light irradiating the flexible substrate of the first regionalized polarizing film and the second regionalized polarizing film has an intensity level approximately between 100 millijoule (mj) and 3000 millijoule (mj).

6. The fabrication method of claim 1, wherein:
the first adhesive layer has a peel strength greater than about 80 g/cm; and
the second adhesive layer has a peel strength between about 20 g/cm and about 50 g/cm.

7. The fabrication method of claim 1, wherein:
the pre-baking temperature is approximately between 90° C. and 130° C.;
the pre-baking time is approximately between 90 seconds and 120 seconds;
the curing temperature is approximately between 210° C. and 230° C.; and
the curing time is approximately between 20 minutes and 50 minutes.

\* \* \* \* \*